United States Patent
Furusawa et al.

(10) Patent No.: US 7,614,515 B2
(45) Date of Patent: Nov. 10, 2009

(54) BLOW MOLDED CONTAINER

(75) Inventors: Mitsuo Furusawa, Ibaraki (JP); Eiji Gotou, Buzenn (JP); Masaru Ono, Buzenn (JP); Tsugio Arai, Ibaraki (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 527 days.

(21) Appl. No.: 11/547,445

(22) PCT Filed: Sep. 28, 2005

(86) PCT No.: PCT/JP2005/017800

§ 371 (c)(1),
(2), (4) Date: Jan. 19, 2007

(87) PCT Pub. No.: WO2006/035795

PCT Pub. Date: Apr. 6, 2006

(65) Prior Publication Data
US 2008/0302757 A1   Dec. 11, 2008

(30) Foreign Application Priority Data
Sep. 30, 2004   (JP) ............................. 2004-288982

(51) Int. Cl.
*B65D 90/02* (2006.01)

(52) U.S. Cl. ............ 215/373; 215/12.1; 215/12.2; 215/370; 215/371

(58) Field of Classification Search ............... 215/12.1, 215/12.2, 370, 371, 385; 220/62.22, 626
See application file for complete search history.

(56) References Cited

U.S. PATENT DOCUMENTS
5,799,809 A     9/1998 Sako et al.
6,039,204 A *   3/2000 Hosokoshiyama et al. .. 220/623

FOREIGN PATENT DOCUMENTS
JP   A-08-175568   7/1996
JP   A-08-216238   8/1996
JP   A-11-300815   11/1999

\* cited by examiner

*Primary Examiner*—Anthony Stashick
*Assistant Examiner*—Madison L Wright
(74) *Attorney, Agent, or Firm*—Oliff & Berridge, PLC

(57) ABSTRACT

The invention is aimed at preventing bottom crack from occurring in a peelably laminated plastic container and maintaining the container stably in good in-use condition. This can be achieved by increasing the anti-peeling strength of a pair of rib strips, with which the bottom rib is formed, in the bottom seal that has been obtained by pinching off the parison at the bottom and molding the parison into a blow molded, peelably laminated plastic container.

The bottom seal 13 of a blow molded, peelably laminated container 1 is reinforced by a pair of rib strips 14 which are pressed to each other to form the bottom rib 15. A multiple number of cavities 16 are formed in the bottom rib 15 in such a way that the rib strip 14 on one side is pushed toward, and caved into, the rib strip on the other side at several points, and vice versa. An expanded portion 18 is formed in the ceiling of each cavity 16. As a result, an undercut engagement portion 19 is formed along the contact faces of both rib strips 14 so that anti-cracking bottom strength of the bottom seal is enhanced.

7 Claims, 7 Drawing Sheets

[Fig. 1]
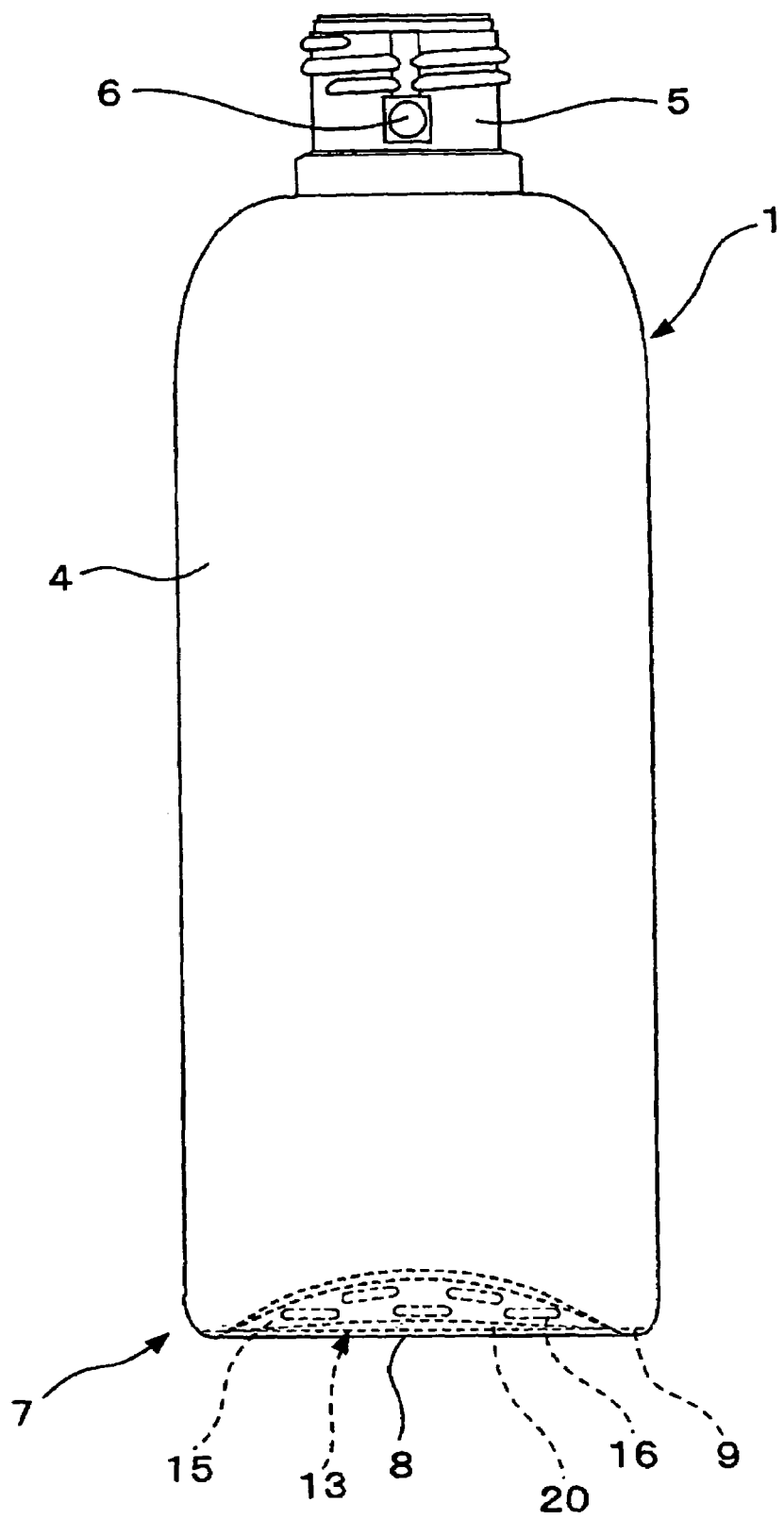

[Fig. 2]
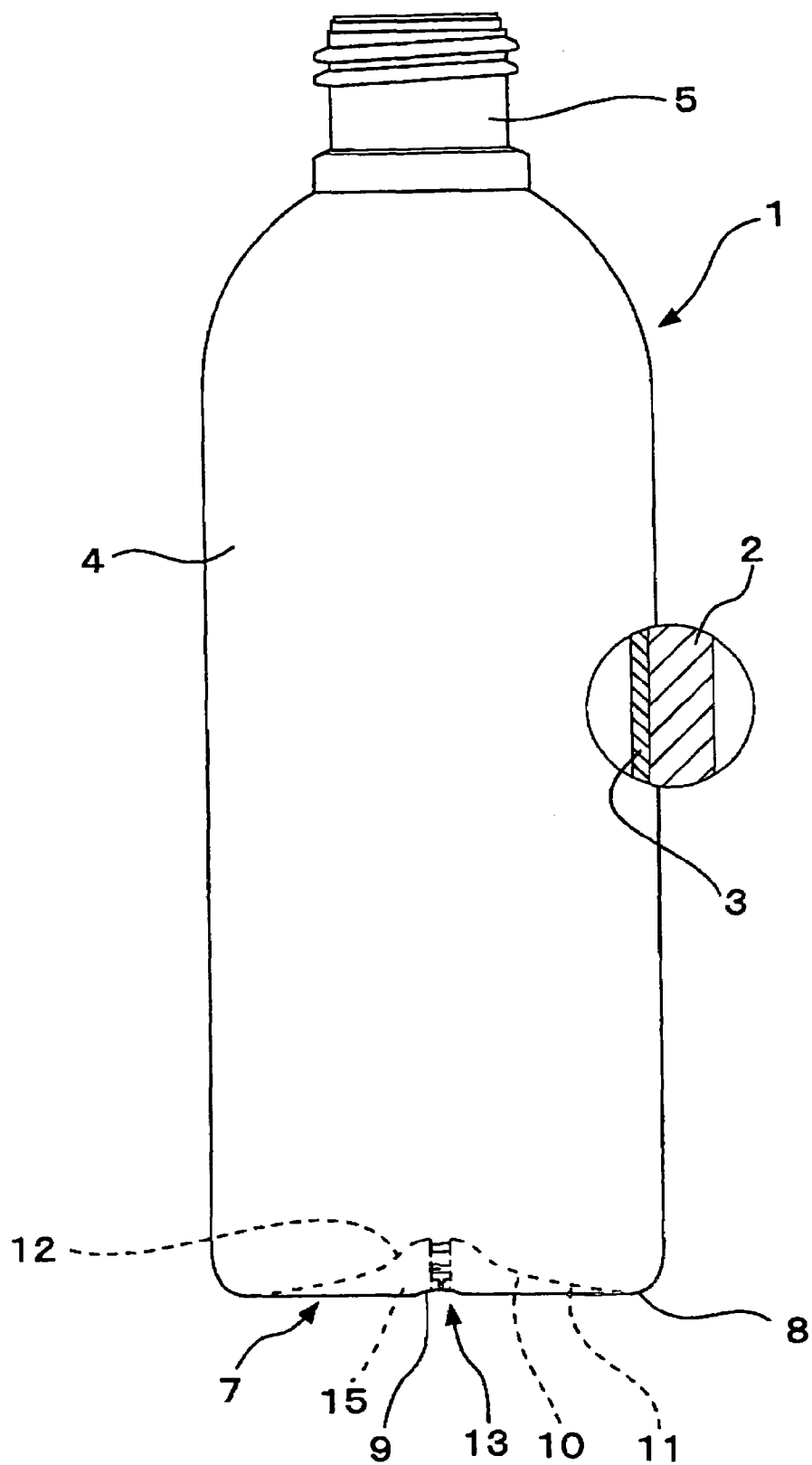

[Fig. 3]
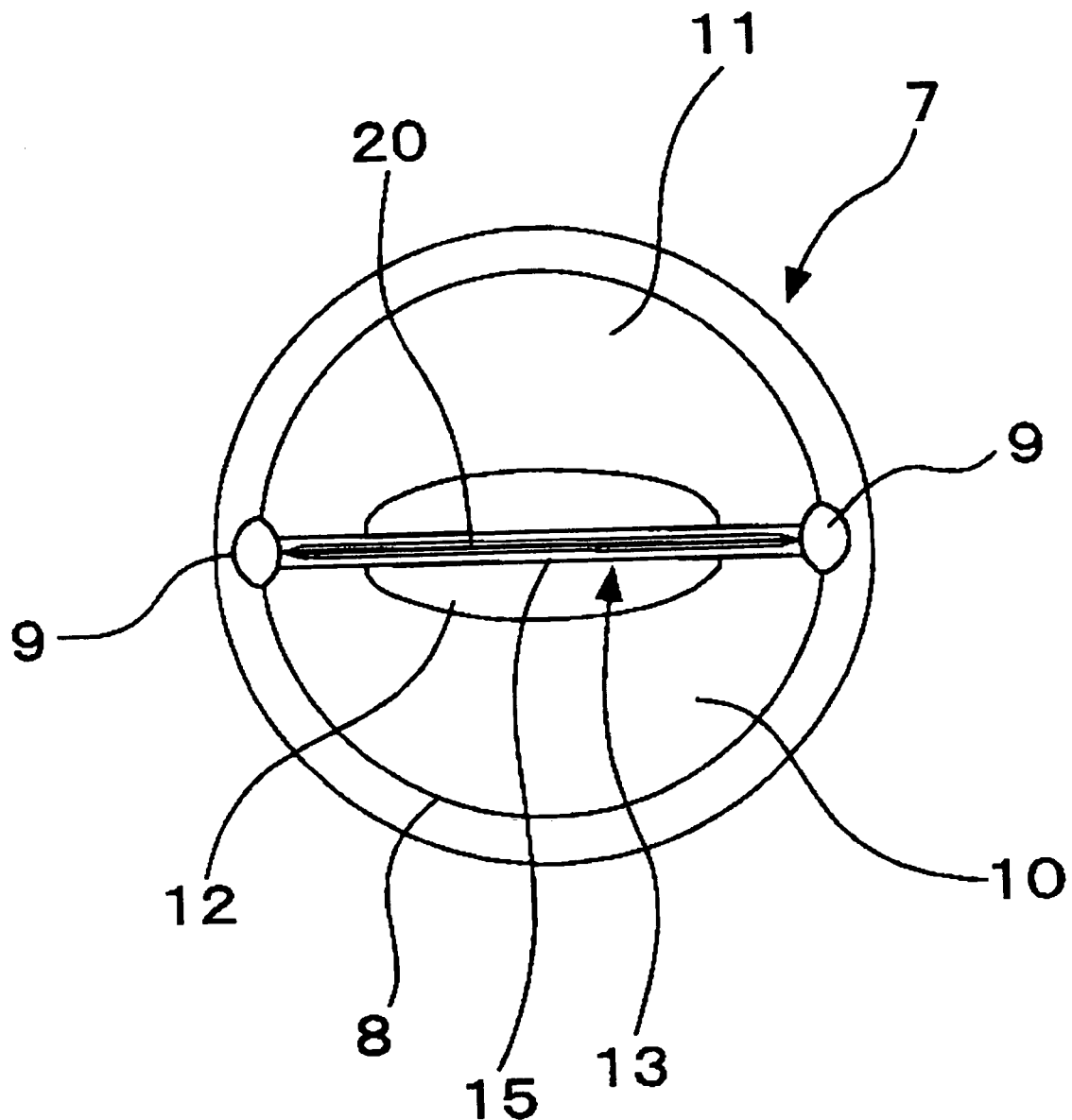

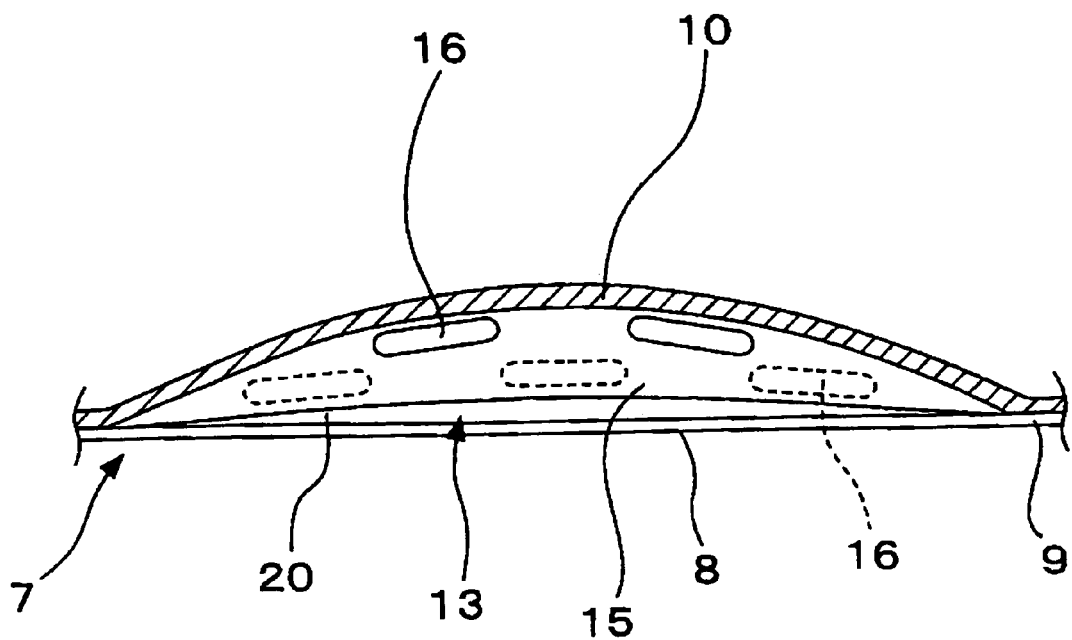
[Fig. 4]

[Fig. 5]
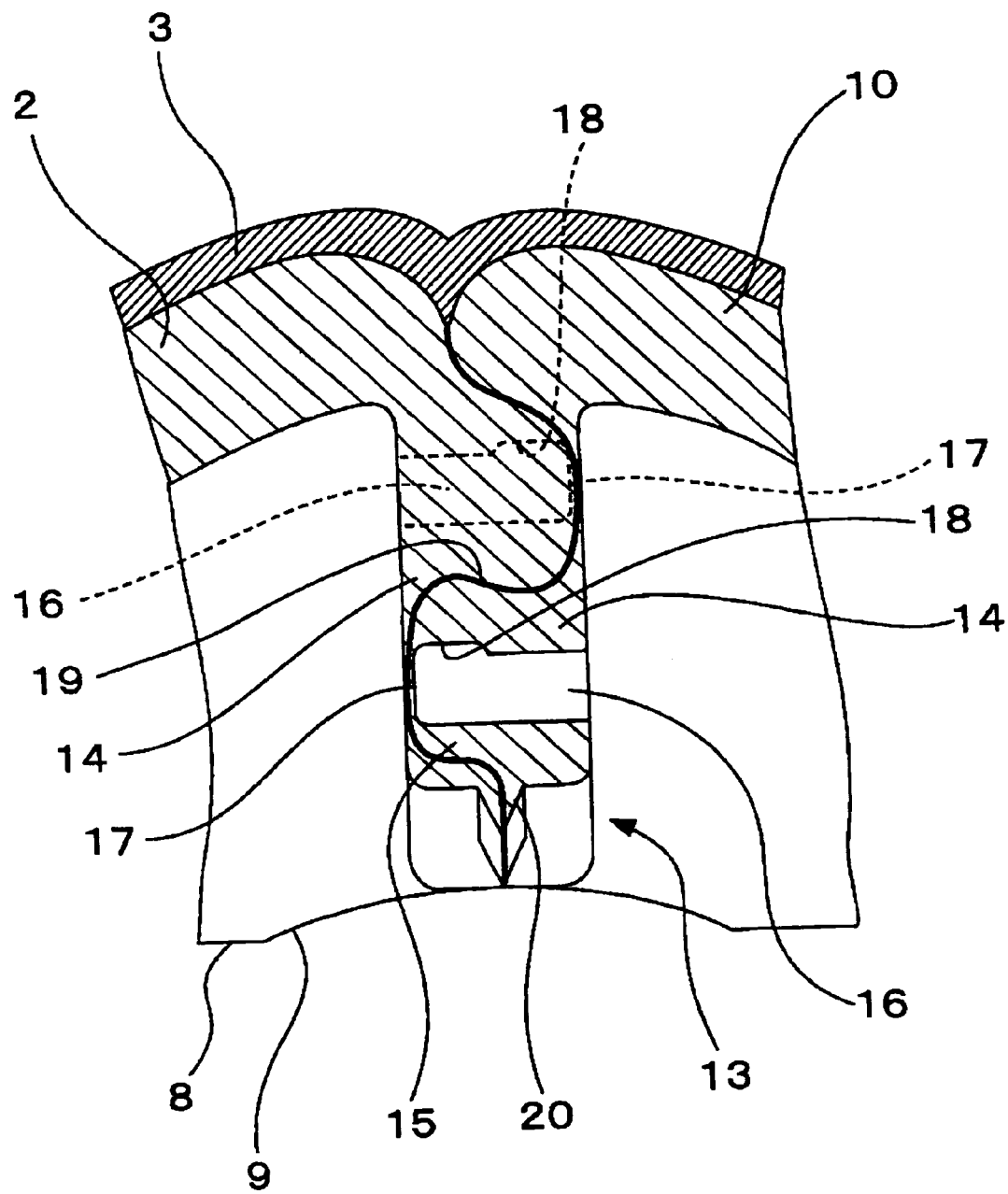

[Fig. 6]
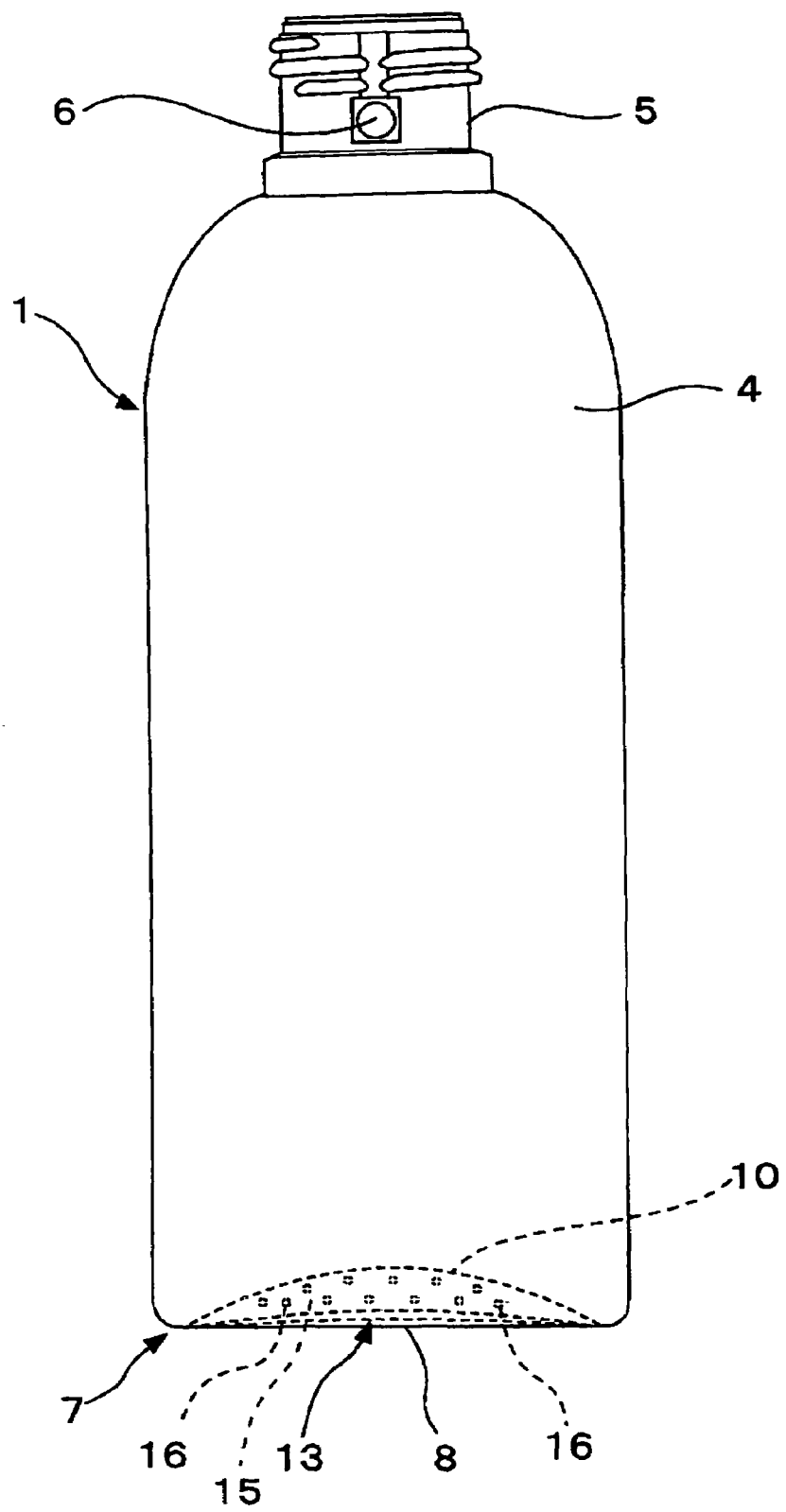

[Fig. 7]
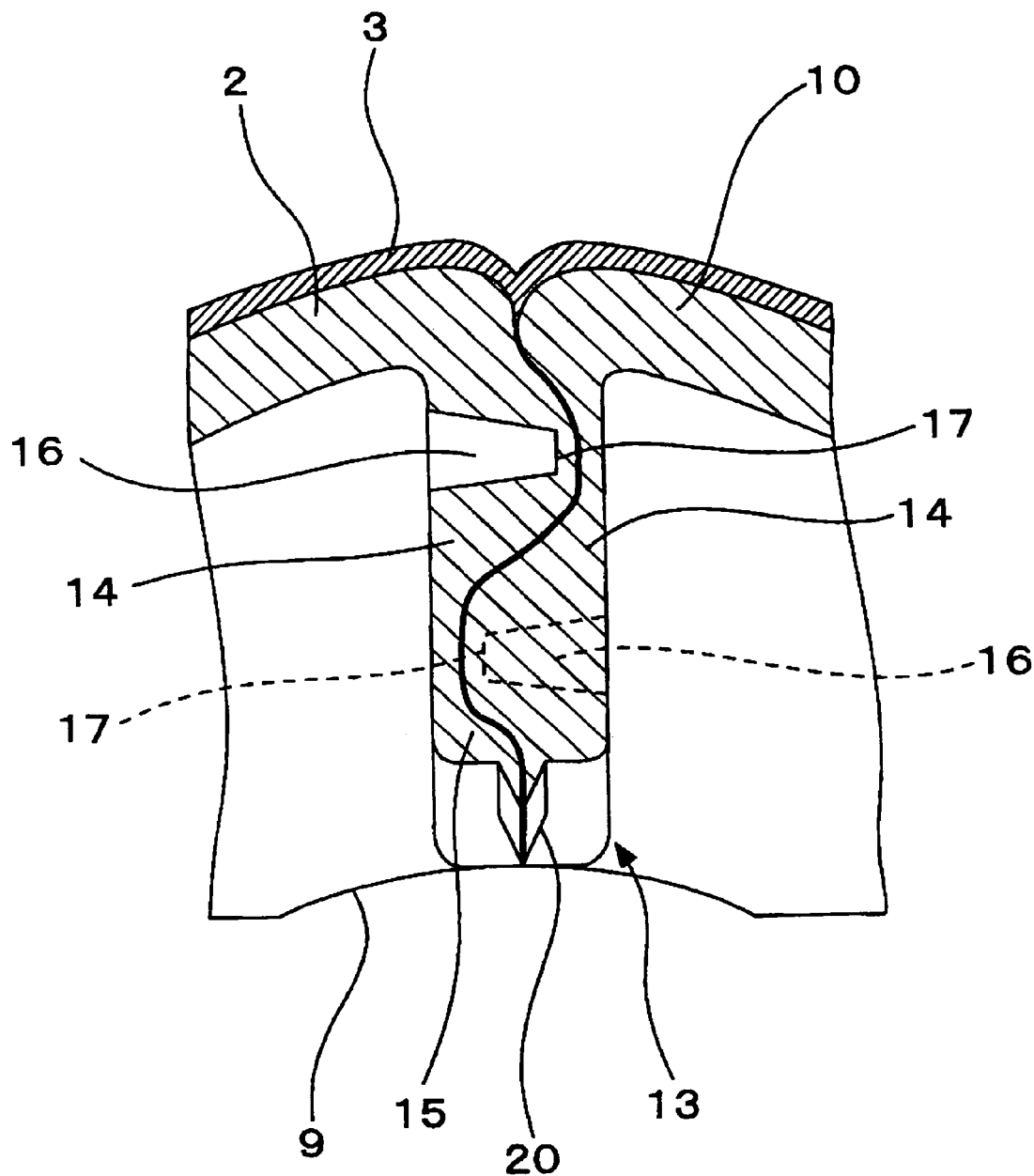

BLOW MOLDED CONTAINER

TECHNICAL FIELD

This invention relates to a structure of the seal in the bottom of a blow molded, peelably laminated plastic container.

BACKGROUND ART

Peelably laminated containers are known. These containers are blow molded bottles, generally known as delaminatable bottles, and are obtained by laminating a highly shape-retainable outer layer with an inner layer in the shape of a highly flexible bag in an easily peelable manner.

These blow molded, peelably laminated plastic containers are manufactured by extruding together an outer layer and an inner layer having little compatibility with each other to form a laminated parison, and by blow molding this laminated parison. The bottom seal of the container is obtained by pressing the parison flat and pinching off the tube by means of the pinch-off section of a blow mold. However, since the bottom seal basically has a laminated structure of outer layers and inner layers that have little compatibility with each other, the users as well as the manufacturers were dissatisfied with the way in which the outer layer portions of the bottom are easily cracked.

As a conventional technology used to relieve this dissatisfaction, there is known a technology shown in Patent Document 1, in which a bottom seal mainly comprises a bottom rib. In this case, the bottom seal is formed by pressing a preform tube flat and pinching off the tube by means of the pinch-off section of a blow mold, and the bottom rib is formed in the shape of a ridge along a parting line by laying a pair of rib strips side by side and pressing the rib strips together. In addition, multiple cavities are laterally disposed in the bottom rib in such a way that the rib strip on one side is pushed toward, and caved into, the rib strip on the other side at several points to form cavities, and vice versa.

[Patent Document 1] Japanese patent application No. 1996-216238

As shown in FIGS. 6 and 7, the conventional technology described in Patent Document 1 relates to a blow molded, peelably laminated plastic container 1 comprising a neck 5 at the upper end, a body 4, and a bottom 7 disposed underneath. The bottom seal is formed in the shape of a ridge having some height, and this shape widens the area of the pressure-bonding between the outer layer 2 and the inner layer 3 in the bottom seal 13. In addition, multiple cavities 16 are formed not only to further increase the area of pressure bonding between the outer layer 2 and the inner layer 3, but also to increase the resistance dramatically against the shearing stress working in parallel to the pressed surface, thus making it possible to obtain a bottom seal 13 having high mechanical strength, while making the crack hard to occur.

DISCLOSURE OF THE INVENTION

In the conventional technology described above, the area of pressure bonding between the outer layer 2 and the inner layer 3 in the bottom seal 13 is widened by forming multiple cavities, so that the extent of pressure bonding between a pair of rib strips 14 can be enhanced. However, anti-peeling strength between the pair of rib strips 14 is not always sufficient, and thus there is a strong need for further enhanced anti-peeling strength between the pair of rib strips 14 in the bottom seal 13.

Especially in the case where the contents are discharged by squeezing and deforming the body 4 of the container 1, rather than discharging the contents with a pump fitted to the container 1, large deflection force acts on the bottom 7 when the body 4 is squeezed and deformed. Therefore, it is necessary to set the pressing strength for the bottom seal 13 at a level fully resisting this deflection force. In the conventional technology described above, the bottom seal 13 does not always withstand the deflection force that acts from the body 4 to the bottom 7. As a result, there arises a problem that the pair of rib strips 14 in the bottom seal 13 breaks away from each other, thus creating a crack in the container 1.

This invention has been made to solve the above-described problem found in conventional art. The technical problem to be solved by this invention is to increase the anti-peeling strength of a pair of rib strips, with which the bottom rib is formed, in the bottom seal that has been obtained by pinching off the parison at the bottom and molding the parison into a blow molded, peelably laminated plastic container. The objects of this invention are to prevent a bottom crack from occurring in a peelably laminated plastic container and to maintain the container stably in good in-use condition.

The means of carrying out the invention according to claim 1 to solve the above-described technical problem is a blow molded, peelably laminated plastic container comprising:
air intake ports disposed in outer layer; and
a bottom having a bottom seal, which is formed by pressing a preform tube flat and pinching off the tube by means of the pinch-off section of a blow mold, said bottom seal comprising a bottom rib, formed in the shape of a ridge by laying a pair of rib strips side by side and pressing the rib strips to each other, and also having cavities formed in this bottom rib,
wherein multiple cave-like cavities are laterally disposed in the bottom rib in such a way that the rib strip on one side is pushed toward, and caved into, the rib strip on the other side at several points to form cavities, and vice versa, and
wherein an expanded portion is formed in the back area of each cavity in an expanded state within a dimensional limit to which blow mold pins for forming the cavities can be forcibly pulled out of the cavities without allowing the expanded portions to lose the molded shape.

In the invention of claim 1, the bottom seal is reinforced by a bottom rib in the shape of a ridge, which is formed by pressing a pair of rib strips to each other. This bottom seal has a wall structure in which outer layer, inner layer, inner layer, and outer layer have been laminated in this order along the pressing direction. Since the ridge has a considerable height, it has a wide pressure bonding area, thus enabling large pressing strength to be obtained even between the outer layer and the inner layer that are little compatible with each other.

The cavities are formed in the bottom rib in such a way that the rib strip on one side is pushed toward, and caved into, the rib strip on the other side at several points to form cavities, and vice versa. Under this structure, the contact faces formed by the outer layers and the combined inner layer in the bottom rib twist and turn in the presence of cavities. This meandering shape results in an increased area of pressure bonding and in the improved pressing strength. In addition, it increases resistance to the shearing force that works in the direction parallel to the main part of the pressure-bonded surfaces.

The cavities are formed by local pressure deformation of the bottom rib caused by strong pressing force, which acts on those portions of the bottom rib near the cavities where one rib strip is pushed toward the other rib strip. Because of this force, the outer layers and the combined inner layer are pressed together strongly at the rear of cavities, and thus, high pressure bonding strength is obtained.

Concerning the resin material located near the cavities, the portions of resin at positions facing the expanded portions are pushed and displaced more extensively than in other portions. Due to the difference in the degree of displacement, undercut engagement portions in a sigmoid shape are formed in the direction against the peel-off of rib strips by the contact faces of both rib strips located near the cavities.

Since this engagement serves as an undercut formed in the direction against the peel-off of both rib strips, it prevents both rib strips substantially from being peeled from each other.

The blow mold pins for forming cavities are forcibly pulled out of the cavities at the time of mold release. It is noted here that the temperature of the resin materials in the bottom seal is within a range of viscoelasticity of the materials that allows the cavities to be restored to their predetermined shape from the deformation caused by the forced pull. In this manner, the undercut engagement is securely formed.

The invention of claim 2 includes the configuration of the invention of claim 1, and also comprises that the expanded portion is provided only in the ceiling of each cavity.

In the invention of claim 2, it is possible for the expanded portion to have a sufficiently expanded height because the expanded portion is provided only in the ceiling of each cavity. In addition, since there is a large amount of resin material above each cavity, the undercut engagement portion has a large extent of engagement.

The invention of claim 3 includes the invention of claim 1 or 2, and also comprises that pressure-bonded portion, i.e., the portion at the rear of each cavity, is formed in the shape of a very thin plate.

In the invention of claim 3, the pressure-bonded portion at the rear of each cavity has the shape of a very thin plate, which makes it possible to apply sufficiently strong pushing force of the blow mold to the resin material of this thin pressure-bonded portion. Such pushing force is the pressure bonding force acting on the contact faces of the resinous outer/inner layers that are formed in the pressure-bonded portion.

The wider the area of the pressure-bonded portion at the rear of each cavity is, and the thinner this portion is, then the more difficult it would be for the resin material of the pressure-bonded portion to move. Therefore, the pushing force of the blow mold acts strongly on the thin pressure-bonded portion having a wide area, and serves effectively as the pressure bonding force that brings the outer layers into firm contact with the inner layer in the pressure-bonded portion.

Since the pressure-bonded portion is in the shape of a sufficiently thin plate, there occurs little shrinkage when the bottom seal is cooled and hardened. Even if shrink-deforming force is applied from surroundings, this deforming force is absorbed as deflective deformation of the entire pressure-bonded portion, thus preventing the peel-off from occurring in this portion.

The invention of claim 4 includes the invention of claim 3, and also comprises that the expanded portion is formed in the area next to the back portion of each cavity.

In the invention of claim 4, the size of the pressure-bonded portion at the rear of each cavity can be increased merely to the extent of the expanded portion without increasing the capacity of each cavity to a large extent.

The invention of claim 5 includes the invention of claim 1, 2, 3, or 4, and also comprises that the cavity has a front view in the shape of a laterally extending elliptical cave.

In the invention of claim 5, the pressure-bonded portions at the rear of the cavities, too, are laterally extending, and thus, have a reasonably much larger size than the conventional pressure-bonded portions have. Furthermore, because a laterally wide rear wall of each cavity is allowed to withstand the shearing force that acts vertically along the contact faces of rib strips, the pressure-bonded portions have strong resistance to this shearing force.

The invention of claim 6 includes the invention of claim 1, 2, 3, 4, or 5, and also comprises that the cavities are formed in two rows, and are tilted from horizontal positions slightly at both ends of the lower row and more steeply in the upper row.

In the invention of claim 6, the cavities can be disposed roughly evenly over the entire width of the bottom rib, which runs along the parting line. There is no need of reducing unreasonably the distance between two adjacent cavities disposed in the lateral direction.

The invention of claim 7 includes the invention of claim 1, 2, 3, 4, 5, or 6, and also comprises that the cavities in the upper row are formed by driving pins into one rib strip, while the cavities in the lower row are formed by driving pins into the other rib strip from the reverse direction.

In the invention of claim 7, the cavities in the upper row are formed in the direction reverse to those cavities in the lower row. The outer layers and the combined inner layer near the cavities are aggressively pulled and significantly stretched when the cavities are formed. As a result, there is an increase in the area of contact faces of the outer/inner layers, and the outer layers are pressed more strongly to both sides of the inner layer. On the whole, the pressing strength for the bottom seal is enhanced.

The cavities in the upper row are disposed on the opposite side of the cavities in the lower row. With multiple cavities in each row, it turns out that both rib strips are engaged with each other on both sides of the main ridge containing the contact faces. Because of this configuration, the rib strips are structurally joined together under a firm condition.

EFFECTS OF THE INVENTION

This invention having the above-described configuration has the following effects:

In the invention of claim 1, the contact faces formed by the outer layers and the combined inner layer in the bottom rib twist and turn in the presence of cavities. This meandering shape results in an increased area of pressure bonding and in the enhanced pressing strength. In addition, it increases resistance to the shearing force that works in the direction parallel to the main part of the pressure-bonded portions.

Undercut engagement portions in a sigmoid shape are formed in the direction against the peel-off of rib strips by the contact faces of the portions of both rib strips at positions facing the expanded portions. Since this engagement serves as an undercut formed in the direction against the peel-off of both rib strips, it prevents both rib strips substantially from being peeled from each other, and thus, strongly prevents the occurrence of bottom cracking.

In the invention of claim 2, the undercut engagement portions have a large extent of engagement, which further strengthens the extent of crack prevention.

In the invention of claim 3, the pushing force of blow mold pins acts on the pressure-bonded portions at the rear of cavities effectively, strongly, and reliably as the pressure bonding force. Therefore, these pressure-bonded portions have quite high pressing strength for the outer/inner layers, and can provide a bottom having stable mechanical strength with no bottom cracking.

Since the pressure-bonded portion at the rear of each cavity is sufficiently thin, it is hardly affected by shrinkage when the bottom seal is cooled and hardened. Even if shrink-deforming force is applied from surroundings, this deforming force is absorbed as deflective deformation of the entire pressure-bonded portion, thus preventing the peel-off from occurring in the pressure-bonded portion.

In the invention of claim 4, the size of the pressure-bonded portion at the rear of each cavity can be increased simply by an extent of expansion of the cavity to form an expanded portion without increasing the capacity of each cavity extensively. Therefore, the pressing strength of the pressure-bonded portion can be enhanced without allowing mechanical strength of the entire bottom seal to go down.

In the invention of claim 5, the size of the pressure-bonded portion at the rear of each cavity can be reasonably enlarged. Furthermore, because a laterally wide rear wall of each cavity is allowed to withstand the shearing force that acts vertically along the contact faces of rib strips, the pressure-bonded portions have strong resistance to this shearing force, and shows strong resistance to bottom cracking.

In the invention of claim 6, the cavities can be disposed reasonably and roughly evenly over the entire width of the bottom rib, which runs along the parting line. The anti-peeling strength and the pressure-bonding strength can also be evenly enhanced over the entire bottom rib. Thus, stable pressure bonding and fitting of the bottom rib can be maintained.

In the invention of claim 7, the cavities in the upper row are formed in the direction reverse to those cavities in the lower row. Both rib strips are pushed toward each other to allow the contact faces to twist and turn so as to form the undercut engagement. The force of pressure-bonding the outer/inner layers to each other in the pressure-bonded portion is enhanced. As a result, there is an increase in the area of pressure bonding between of the outer/inner layers in the bottom seal, and thus, the anti-peeling strength and the pressure-bonding strength are enhanced for the outer and inner layers in the bottom seal.

BRIEF DESCRIPTION OF THE DRAWINGS

FIG. 1 is a front elevational view of the entire container in the embodiment of this invention.

FIG. 2 is a side elevational view of the entire container in the embodiment shown in FIG. 1, with a partly enlarged, vertically sectioned view of the wall.

FIG. 3 is a bottom view of the container in the embodiment shown in FIG. 1.

FIG. 4 is an enlarged, vertically sectioned front view of the container bottom in the embodiment shown in FIG. 1, taken at a position slightly deviated from the parting line.

FIG. 5 is an enlarged, vertically sectioned view of the important portion showing the details of the bottom seal in the embodiment shown in FIG. 1.

FIG. 6 is a front elevational view of the entire container in the conventional art.

FIG. 7 is an enlarged, vertically sectioned view of the important portion showing the details of the bottom seal of the container shown in FIG. 6.

EXPLANATION OF CODES

1. Container
2. Outer layer
3. Inner layer
4. Body
5. Neck
6. Air intake port
7. Bottom
8. Foot ring
9. Concave portion
10. Bottom wall
11. Slope
12. Upheaved portion
13. Bottom seal
14. Rib strip
15. Bottom rib
16. Cavity
17. Pressure-bonded portion
18. Expanded portion
19. Undercut engagement portion
20. Pinch-off portion

PREFERRED EMBODIMENT OF THE INVENTION

This invention is further described with respect to a preferred embodiment, now referring to the drawings.

FIG. 1 is a front elevational view of the container 1 according to this invention. FIGS. 2 and 3 are a side view and a bottom view, respectively, of the same. The container 1 is a blow molded container in which outer layer 2 is laminated with inner layer 3 (See FIG. 2). The outer layer 2 is made of a synthetic resin material, such as polyethylene, polypropylene, and the like, and is molded so as to have a necessary ability to retain the shape of its own. The inner layer 3 is made of a synthetic resin material that is little compatible with the outer layer 2, such as nylon, ethylene vinyl alcohol copolymer, polyethylene terephthalate, and the like, and is molded into a bag capable of flexible deformation.

This container 1 comprises a cylindrical body 4; a neck 5 standing on the upper end of the body 4, with screw thread notched on the outer surface, and having air intake ports 6 disposed in the front and the rear of the neck 5 and drilled in the outer layer 2 to take in outside air in the void between the outer layer 2 and the inner layer 3; and a bottom 7 having a round bottom wall 10 at the lower end of the body 4.

The bottom 7 (See FIGS. 3 and 4) comprises a foot ring 8 serving as the foot of the container 1, the bottom wall 10 surrounded by the foot ring 8 and dented upward, and a bottom seal 13 connected integrally to this bottom wall 10 and running across the bottom wall 10 along the parting line.

The foot ring 8 (See FIGS. 2 and 3) has a wall structure with the cross-section in an arc shape, and circularly connects the upright cylindrical wall on the outside with the lower periphery of inner sloped-down cylindrical wall. There is a pair of concave portions 9 where inside corners of the foot ring 8 at axisymmetrical positions on the parting line are partly dented.

The bottom wall 10 (See FIGS. 2, 3, and 4) comprises a gentle, slightly concave slope 11 spreading over the entire conical surface, surrounded by, and connected to, the inner periphery of the foot ring 8; and a thick upheaved portion 12 of a dome-like structure that run across the central part of this slope 11 along the parting line and has a plan view of a roughly elliptical shape, with the long axis running down the parting line.

The bottom seal (FIGS. 3, 4, and 5) is located centrally across the upheaved portion 12 of the bottom wall 10, with both ends being connected to the concave portions 9 of the foot ring 8. When a parison is blow molded into the container 1, a pair of rib strips 14 is obtained by pressing this parison flat and pinching it off. This pair of rib strips 14 is pressed together to form the bottom rib 15 in the shape of a ridge. Under the lower face of this bottom rib 15 there remains a pinch-off portion 20, i.e., the portion of the parison that has been pinched off, along the entire length of the bottom rib 15.

The bottom rib 15 is provided with cave-like cavities 16, which are formed in two rows when one rib strip 14 is pushed toward, and caved into, the rib strip on the other side at several points. The depth of the cavities thus formed is larger than the thickness of the rib strip 14 and a little smaller than the thickness of the bottom rib 15. The cavities in the upper row are formed in the bottom rib on one side, and the cavities in the lower row are formed in the bottom rib on the other side. In the side view, these cavities are tilted from horizontal positions slightly at both ends of the lower row and more steeply in the upper row.

The bottom seal 13 has a longitudinal rib structure in which the seal 13 goes across the bottom wall 10 along the parting line. Because of this structure, the bottom seal 13 prevents the hanging deformation from occurring in the center of the bottom wall 10, which may be caused by the time-lapsed shrinking deformation after the completion of blow molding.

Each cavity 16 has a laterally extending elliptical shape in its front view. As shown in FIG. 4, the cavities 16 are formed in two rows, and are tilted from horizontal positions slightly at both ends of the lower row and more steeply in the upper row. These cavities are disposed in such a manner that the cavities in the upper row are located above the spaces between two adjacent cavities in the lower row so as to block these spaces. In the longitudinally sectional structure shown in FIG. 5, each cavity 16 is provided with an expanded portion 18 in the ceiling within a dimensional limit to which blow mold pins for forming the cavities 16 can be forcibly pulled out of the cavities without allowing the expanded portions to lose the molded shape.

Under the structure in which each cavity 16 has an expanded portion 18 in the ceiling, the resin material located right above this expanded portion 18 is pushed upward, as can be seen in FIG. 5. Therefore, an undercut engagement portion 19 is formed right above the cavity 16, as the contact faces of both rib strips 14 twist and turn to form an undercut structure. This undercut engagement portion 19 strongly prevents both rib strips 14 from being peeled off.

The pressure-bonded portion 17 at the rear of each cavity 16 is in the shape of a fully thin plate. Since the cavity 16 has a front view in a laterally extending elliptical shape and is also provided with an expanded portion 18, the pressure-bonded portion 17 has a reasonably large area or size.

It is preferred that the pressure-bonded portion 17 is as thin as possible within a limit to which this portion 17 can maintain necessary mechanical strength. A suitable thickness is in the range of 1/10 to 1/20 of the thickness of the bottom rib 15.

The container 1 comprising the outer layer 2 of low-density polyethylene and the inner layer 3 of nylon was molded to have a total height of 154.3 mm and a body outer diameter of 44.8 mm, with the bottom rib 15 having a height of 5 mm, a width of 38 mm, and a thickness of 1.8 mm. This container 1 was used to make a comparison of anti-cracking bottom strength between an example of conventional art shown in FIGS. 6 and 7 and the embodiment of this invention shown in FIGS. 1 to 5.

The container 1 in the embodiment of this invention had five cavities 16. The pressure-bonded portion 17 had a total area of 20.32 mm$^2$, and the expanded portion 18 had an expanded height of 0.1 mm. On the other hand, the container 1 of conventional art had thirteen cavities 16. The pressure-bonded portion had a total area of 1.638 mm$^2$.

Pushing force was applied to the bottom 7 of the container 1 in the embodiment of this invention and in the comparable example of conventional art at 20 mm/min from the direction along the parting line. In the embodiment of this invention, bottom cracking occurred at the pushing force of 5.64 kg at which the distortion occurred at a degree of 3.48 mm. In the case of conventional art, the bottom was cracked at the pushing force of 3.94 kg at which the distortion occurred at a degree of 2.14 mm.

As obvious from the result of comparison described above, the container in the embodiment of this invention shown in the figures gave anti-cracking bottom strength nearly 1.5 times as much as the level obtained by the conventional art shown similarly in the figures.

The invention claimed is:

1. A blow molded, peelably laminated plastic container comprising:
    air intake ports disposed in outer layer; and
    a bottom having a bottom seal, which is formed by pressing a preform tube flat and pinching off the tube by means of a pinch-off section of a blow mold, said bottom seal comprising a bottom rib, formed in the shape of a ridge by laying a pair of rib strips side by side and pressing these rib strips to each other, and also cavities formed in this bottom rib,
    wherein multiple cave-like cavities are laterally disposed in the bottom rib in such a way that the rib strip on one side is pushed toward, and caved into, the rib strip on the other side at several points to form the cavities, and vice versa, and
    wherein an expanded portion is formed in the back area of each cavity in an expanded state within a dimensional limit to which blow mold pins for forming the cavities can be forcibly pulled out of the cavities without allowing the expanded portions to lose the molded shape.

2. The blow molded, peelably laminated container according to claim 1, wherein the expanded portion is provided only in the ceiling of each cavity.

3. The blow molded, peelably laminated container according to claim 1, wherein a pressure-bonded portion, i.e., the portion at the rear of each cavity, is formed in the shape of a very thin plate.

4. The blow molded, peelably laminated container according to claim 3, wherein the expanded portion is formed in the area next to the back portion of each cavity.

5. The blow molded, peelably laminated container according to claim 1, wherein the cavities have a front view in the shape of a laterally extending elliptical cave.

6. The blow molded, peelably laminated container according to claim 1, wherein the cavities are formed in two rows and are tilted from horizontal positions slightly at both ends of the lower row and more steeply in the upper row.

7. The blow molded, peelably laminated container according to claim 1, wherein the cavities in the upper row are formed by driving pins into one rib strip, while the cavities in the lower row are formed by driving pins into the other rib strip from a reverse direction.

* * * * *